(12) United States Patent
Takaoka et al.

(10) Patent No.: US 11,486,766 B2
(45) Date of Patent: Nov. 1, 2022

(54) TEMPERATURE MEASURING DEVICE

(71) Applicant: SHASHIN KAGAKU CO., LTD., Kyoto (JP)

(72) Inventors: Fumihiko Takaoka, Kyoto (JP); Ryosuke Eto, Kyoto (JP)

(73) Assignee: SHASHIN KAGAKU CO., LTD., Kyoto (JP)

( * ) Notice: Subject to any disclaimer, the term of this patent is extended or adjusted under 35 U.S.C. 154(b) by 135 days.

(21) Appl. No.: 16/651,321

(22) PCT Filed: Sep. 11, 2018

(86) PCT No.: PCT/JP2018/033667
§ 371 (c)(1),
(2) Date: Mar. 26, 2020

(87) PCT Pub. No.: WO2019/073738
PCT Pub. Date: Apr. 18, 2019

(65) Prior Publication Data
US 2020/0232850 A1    Jul. 23, 2020

(30) Foreign Application Priority Data

Oct. 13, 2017 (JP) .............................. JP2017-199844

(51) Int. Cl.
*G01J 5/00* (2022.01)
*B01D 19/00* (2006.01)
(Continued)

(52) U.S. Cl.
CPC ........ *G01J 5/0037* (2013.01); *B01D 19/0063* (2013.01); *B01D 19/02* (2013.01);
(Continued)

(58) Field of Classification Search
None
See application file for complete search history.

(56) References Cited

U.S. PATENT DOCUMENTS 4,828,376 A * 5/1989 Padera ................. G02B 27/644
                                                              359/555
9,273,586 B2 * 3/2016 Nojiri ................... F01N 11/002
(Continued)

FOREIGN PATENT DOCUMENTS

CN          1872378 A      12/2006
CN       202562625 U      11/2012
(Continued)

OTHER PUBLICATIONS

Translation of JP2011045873A, accessed Oct. 21, 2021 (Year: 2010).*
(Continued)

*Primary Examiner* — Christopher P Jones
*Assistant Examiner* — Phillip Y Shao
(74) *Attorney, Agent, or Firm* — McCoy Russell LLP

(57) ABSTRACT

A temperature-measuring device including a transmitter and a receiver. The transmitter is configured to measure the temperature of the material being contained in a container being revolved and/or rotated, and is configured to transmit data including a value of the measured temperature. The receiver is configured to receive the transmitted data. The transmitter is disposed in or on an upper lid detachably secured to the container, so that the transmitter can detect an incident light emitted from the material, and the transmitter can be revolved along with the container.

6 Claims, 9 Drawing Sheets

(51) Int. Cl.
    *B01D 19/02*     (2006.01)
    *G01J 5/02*     (2022.01)
    *B01F 29/90*     (2022.01)
    *B01F 35/21*     (2022.01)

(52) U.S. Cl.
    CPC ........ *B01F 29/90* (2022.01); *B01F 35/21151* (2022.01); *G01J 5/026* (2013.01)

(56) References Cited

U.S. PATENT DOCUMENTS

| | | |
|---|---|---|
| 2006/0160687 A1 | 7/2006 | Malmqvist et al. |
| 2015/0174539 A1 | 6/2015 | Eberle et al. |
| 2015/0233766 A1* | 8/2015 | Xu ............................ G01J 5/28 374/130 |

FOREIGN PATENT DOCUMENTS

| | | |
|---|---|---|
| CN | 202563635 U | 11/2012 |
| CN | 104707521 A | 6/2015 |
| CN | 205403963 U | 7/2016 |
| CN | 205667817 U | 11/2016 |
| JP | H0929086 A | 2/1997 |
| JP | 3627220 B1 | 3/2005 |
| JP | 2006305512 A | 11/2006 |
| JP | 2007245110 A | 9/2007 |
| JP | 2011045873 A | 3/2011 |
| JP | 2011185693 A | 9/2011 |
| JP | 2011218300 A | 11/2011 |
| JP | 2013244475 A | 12/2013 |
| JP | 2016159186 A | 9/2016 |
| JP | 2017176990 A | 10/2017 |
| WO | 2008078368 A1 | 7/2008 |

OTHER PUBLICATIONS

Translation of JP2006305512, accessed Jan. 7, 2022 (Year: 2006).*
Japanese Patent Office, Office Action Issued in Application No. 2017-199844, dated May 1, 2018, 12 pages. (Submitted with Machine Translation).
ISA Japanese Patent Office, International Search Repod Issued in Application No. PCT/JP2018/033667, dated Nov. 27, 2018, WIPO, 2 pages.
Japanese Patent Office, Reasons for Revocation Issued in Application No. 2017-199844, Patent Opposition Objection No. 2018-700879, dated Jun. 10, 2019, 58 pages. (Submitted with Machine Translation).
Japanese Patent Office, Reasons for Revocation Issued in Application No. 2017-199844, Patent Opposition Objection No. 2018-700879, dated Sep. 30, 2019,128 pages. (Submitted in Two Parts with Machine Translation).
State Intellectual Property Office of the People's Republic of China, Office Action and Search Report Issued in Application No. 20188002565.X, dated Oct. 29, 2019, 15 pages. (Submitted with Partial Translation).
State Intellectual Property Office of the People's Republic of China, Office Action and Search Report Issued in Application No. 201880002565.X, dated Apr. 1, 2022, 14 pages. (Submitted with Machine Translation).

* cited by examiner

TEMPERATURE MEASURING DEVICE

CROSS-REFERENCE TO RELATED APPLICATIONS

The present application is a U.S. National Phase of International Patent Application Serial No. PCT/JP2018/033667 entitled "TEMPERATURE MEASUREMENT DEVICE, TEMPERATURE MEASUREMENT METHOD, AND AGITATION/DEFOAMING METHOD FOR MATERIAL BEING PROCESSED," filed on Sep. 11, 2018. International Patent Application Serial No. PCT/JP2018/033667 claims priority to Japanese Patent Application No. 2017-199844 filed on Oct. 13, 2017. The entire contents of each of the above-referenced applications are hereby incorporated by reference for all purposes.

TECHNICAL FIELD

The present invention relates to a temperature-measuring device, a method of measuring the temperature of the material to be agitated/defoamed in a container, and a method for agitating/defoaming the material.

BACKGROUND AND SUMMARY

An agitation/defoaming device for revolving and rotating a container containing a material to be agitated/defoamed (hereinafter, simply referred to as "material"), is known.

Such an agitation/defoaming device applies a centrifugal force by rotating materials, such as a liquid mixed with various liquid materials and an admixture material mixed with powder and liquid materials, and it agitates and defoams the material.

A rotary motion applied to the material may cause a friction with the container, and the friction or other factors tends to typically raise the temperature of the material. Such temperature change depends on viscosity, specific heat, heat capacity, and other conditions of the material.

Some materials may undergo a chemical change or the properties of the materials may be changed by a rise temperature, and thus, the agitation/defoaming process needs to be performed under a condition where the temperature is managed.

Patent document 1 discloses a device for measuring a temperature of a material using a temperature sensor disposed in the bottom of the container containing the material.

Patent document 2 discloses a method of measuring a temperature of a material in a container from the top of the container without any contact with the material.

Patent document 3 discloses a method of measuring a temperature of a material in a container using a temperature sensing resistor element that is extended from the upper part of container (sample holder).

CITATION LIST

[Patent Document 1]: Japanese Unexamined Patent Application Publication No. 2016-159186
[Patent Document 2]: Japanese Patent Application No. 3627220
[Patent Document 1]: Japanese Unexamined Patent Application Publication No. 2006-305512

Technical Problems

However, with the method as described in the patent document 1, the temperature of the object is indirectly measured, but the temperature of the material cannot be measured at high sensitivity to the temperature temporal change when a container having a low thermal conductivity is used.

The device, as described in the patent document 2, measures the temperature of the top of the container without any contact with the material, using a radiation thermometer fixed to the housing, and thus requires a highly advanced technology. This means that a temperature sensor shall be disposed accurately in an extended line of a rotational shaft of the container and that the temperature of the material in the container shall bois measured synchronously with a revolution period of the container.

With the method as described in the patent document 3, the temperature sensing resistor element is inserted into the container, but this method may cause some problems. For example, the temperature sensing resistor element inserted may interrupt the agitation/defoaming processing flow, or the self-heating of the temperature sensing resistor element may raise the temperature of the material.

Furthermore, with this method, a centrifugal force of the rotational motion lowers the central axis portion of the material, and thus, a detector needs to be placed adjacent to the bottom of the container. This method locally measures only the temperature adjacent to the bottom of the container.

Additionally, when air bubbles exist around the temperature sensing resistor element during the agitation/defoaming process, the air bubbles may interrupt the heat flow from the material to the temperature sensing resistor element. Consequently, the lower temperature than the actual temperature may be displayed as the measured temperature.

Such a temperature sensing resistor element locally measuring the temperature of the material is strongly influenced by the flow of the material. Consequently, the temperature temporal changes of the material cannot be overall accurately measured using the temperature sensing resistor element.

Although the patent document 3 discloses a method to detect a temperature of a container using an infrared temperature sensor, the same problem as that in the patent document 1 may still occur.

To solve the above problem, it is a material of the present invention to provide a temperature-measuring device and a temperature-measuring method capable of accurately, easily, and in real-time monitoring a temperature of a material to be agitated/defoamed, and to provide an agitation/defoaming method capable of controlling the temperature of the material using the temperature-measuring device.

Solution to Problem

According to the present invention, a temperature-measuring device includes a transmitter and a receiver. The transmitter is configured to measure a temperature of a material without contact, the material being contained in a container being revolved and/or rotated, and is configured to transmit data including a value of the measured temperature. The receiver is configured to receive the transmitted data. The transmitter is disposed in or on an upper lid detachably secured to the container, so that the transmitter can detect an incident light emitted from the material, and the transmitter can be revolved along with the container.

In the above configuration, the transmitter may include:
a. a sensor configured to measure the temperature of the material without contact,
b. a power supply configured to supply electricity to the sensor, and c. a processor configured to transmit the data including the value of the measured temperature to the receiver, and the receiver may include:

storage for storing the value of the measured temperature. Such a configuration may accurately, easily, and in real-time measure the temperature of the material during a revolving/rotational motion (revolving motion and rotational motion) process.

In the above, "during a revolving/rotational motion (revolving motion and rotational motion) process" refers to a period from the time when the container containing the material is placed onto a container holder of an agitation/defoaming device to the time when the container is detached from the container holder.

As described below, when the transmitter is turned on (ON) or turned off (OFF) using an acceleration sensor, "during a process" refers to a period from the time when the rotary motion is applied to the container holder (the acceleration sensor detects acceleration more than or equal to the predetermined threshold) to the time when a rotary motion of the container holder is stopped (the acceleration sensor detects acceleration at a predetermined threshold or less). In the above configuration, the sensor may have a view angle equal to or greater than 20° and less than or equal to 90°. Such a configuration can accurately measure the temperature of the material in the container, even if the material is raised up along the side wall of the container by centrifugal force.

In the above configuration, the sensor may comprise an optical element that is located in a light incident opening of the sensor and that is movable in an optical axial direction of the sensor. In the above configuration, the sensor may comprise an optical element disposed on an extension line of an optical axis of the sensor and at a position separated away from the light incident opening of the sensor. Such a configuration can adjust the measuring field of the sensor and can achieve the suitable measuring field depending on the container and the material.

In the above configuration, the transmitter may be disposed in or on the upper lid of the container. Such a configuration allows the temperature-measuring device of the present invention to be easily applied to known devices for performing a rotary process, such as an agitation/defoaming device, and thus, the temperature-measuring device having high extendability can be obtained.

In the above configuration, the transmitter may be disposed in or on a revolving body that revolves synchronously with the container, and may be disposed above the container. Such a configuration allows the container to be easily replaced, and it can improve productivity for producing products.

In the above configuration, the transmitter may be swingably supported by a spherical bearing. Such a configuration can constantly measure the temperature of the material, corresponding to the raise-up phenomenon of the material along the side wall of the container.

In the above configuration, the transmitter may further include an acceleration sensor, and may start measuring the temperature of the material when the acceleration sensor detects acceleration more than or equal to the predetermined threshold. Such a configuration can automatically measure the temperature of the material, and it can achieve power saving.

According to the present invention, a temperature-measuring method for measuring a temperature of a material contained in a container being revolved and/or rotated includes repeating a transmission cycle performed by a transmitter and repeating a reception cycle performed by a receiver. The transmitter is disposed above the container and the receiver is disposed outside of the container.

The transmission cycle includes:

a. a measurement step for measuring the temperature of the material without contact, b. a transmission step for transmitting data including a value of the measured temperature, and c. a standby step for waiting for a predetermined time.

The reception cycle includes:

a. following the transmission step, a reception step for receiving the transmitted data including the value of the measured temperature, and b. a storing step for storing the data.

Such a temperature-measuring method can in real-time measure the temperature of the material and can store the measured data of the material as a processing history of the device while the rotary process, such as an agitation/defoaming process, is being performed. It also leads to a quality control of products obtained through the rotary processing.

The above method includes repeating the reception cycle performed by the receiver, and the reception cycle may further include:

a. following the storing step, a comparison step for comparing the data with a reference data pre-stored in storage of the receiver, and b. a determination step for determining whether the data is deviated from the reference data.

By using the temperature-measuring method, it is possible to confirm whether the rotary process, such as an agitation/defoaming process, is a process as scheduled, and to immediately determine presence/absence of processing abnormality.

According to the present invention, an agitation/defoaming method for agitating and/or defoaming a material contained in a container being revolved and/or rotated includes repeating a transmission cycle performed by a transmitter and repeating a reception cycle performed by a receiver. The transmitter is disposed above the container and the receiver is disposed outside of the container.

The transmission cycle includes:

a. a measurement step for measuring the temperature of the material without any contact with the material, b. a transmission step for transmitting data including a value of the measured temperature, and c. a standby step for waiting for a predetermined time.

The reception cycle includes:

a. following the transmission step, a reception step for receiving the transmitted data including the value of the measured temperature, b. a storing step for storing the data, c. following the storing step, a comparison step for comparing the data with a reference data pre-stored in storage of the receiver, and d. a calculation step for calculating a divergence value between the data and the reference data.

At least one of a revolving frequency and a rotational frequency is changed depending on the divergence value.

With such an agitation/defoaming method, the agitation/defoaming processing condition can be automatically modified, and thus, the material can be processed under suitable processing conditions.

Advantageous Effect

According to the present invention, the temperature of the material can be in real-time and accurately measured from the above of the container during the rotary processes, such as a revolving motion and a rotational motion. The present invention can be applied to a variety of rotary processing devices, such as an agitation/defoaming device and is useful.

According to the present invention, presence/absence of processing abnormality can be determined while the agitation/defoaming process is being performed, and the suitable processing condition can be maintained.

Additionally, a temperature-measuring device and a temperature-measuring method according to the present invention can be applied not only to the agitation/defoaming device but also to any rotary processing devices for revolving/rotating the container containing the material. Examples of the rotary processing devices include a polishing processing device, a grinding processing device (e.g. ball mill), and a centrifuge processing device.

DESCRIPTION OF EMBODIMENTS

Embodiments of the present invention will be described below with reference to drawings. However, each embodiment should not be interpreted so as to limit the gist of the invention. The same or similar members are identified with the same reference symbols, and their description may be omitted from the description of subsequent embodiments.

First Embodiment

Configurations of a temperature-measuring device and a temperature-measuring method will be described in detail while, as one example, the temperature-measuring device and the temperature-measuring method are applied to an agitation/defoaming device. However, the temperature-measuring device according to the present invention can also be applied to other devices, such as a polishing processing device, a grinding processing device (e.g. ball mill), and a centrifuge processing device.

Device Configuration

Figure 1:
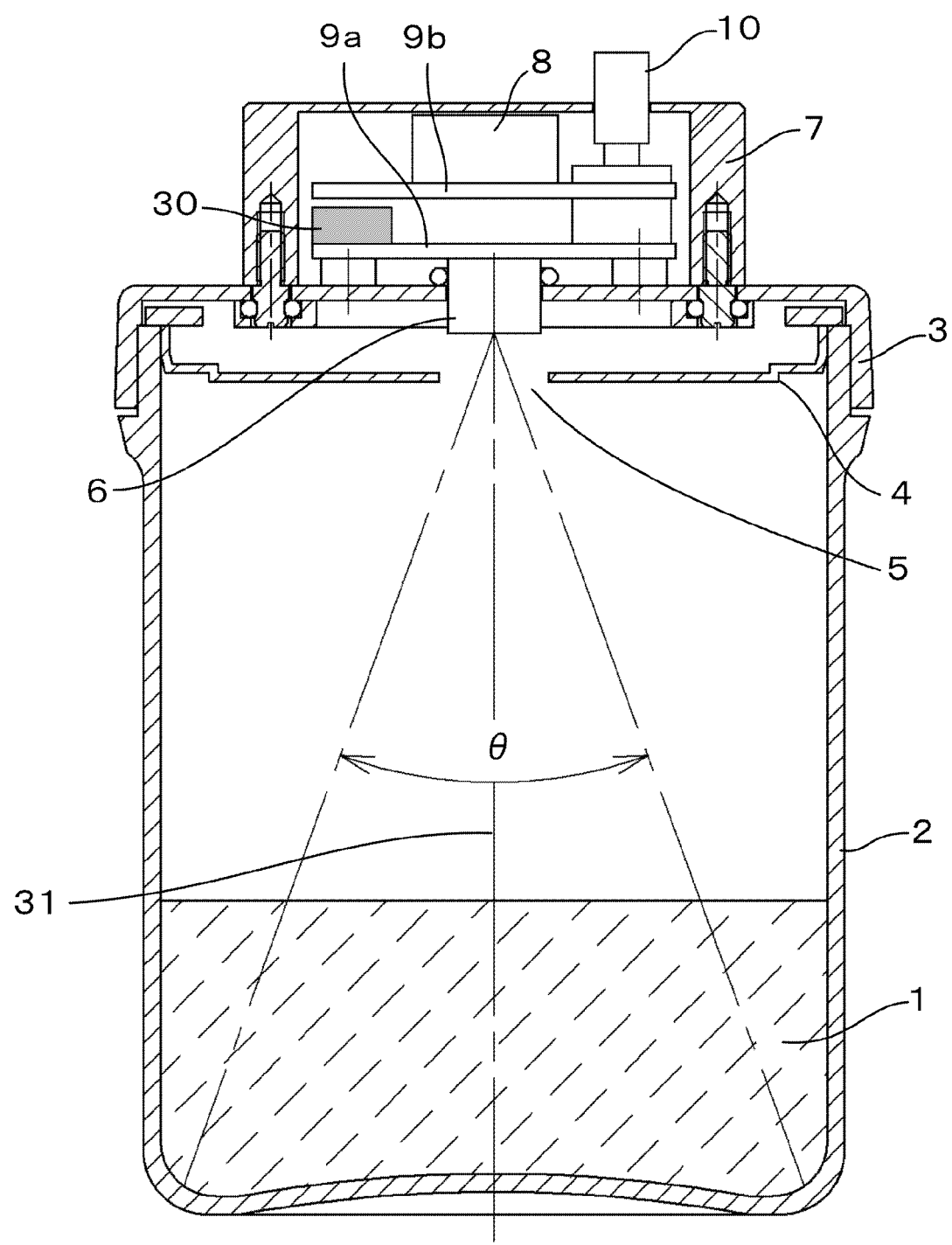
FIG. 1 is a cross-sectional view of a container with a temperature-measuring device according to a first embodiment of the present invention.

FIG. 1 illustrates a configuration of a container 2 containing a material 1 in the agitation/defoaming device according to a first embodiment of the present invention. The container 2 is rotated while being revolved using the agitation/defoaming device, and it enables the material 1 to be agitated and defoamed. The container 2 typically forms rotational symmetry shape, preferably a cylinder with a bottom, to be suitable for rotation. An upper lid 3 is detachably secured to the top of the container 2 using screws or the like, and an inner lid 4 is secured to be enclosed between the upper lid 3 and the container 2.

A radiation thermometer 6 is a non-contact temperature measurement device, and for example, an infrared sensor. The radiation thermometer 6 is disposed in or on the upper lid 3 and has a light incident opening facing to the material 1. The radiation thermometer 6 detects light that is radiated from the material 1 and that enters the radiation thermometer 6 through an opening 5 formed in the inner lid 4, thereby measuring the temperature of the material.

A cover 7 is secured to the upper lid 3 using bolts or the like so as to cover the radiation thermometer 6, and can prevent unnecessary external light from coming in and from causing a disturbance. The container 2, the upper lid 3, and cover 7 may be preferably made from materials that can shield lights in a wavelength region to be measured. Alternatively, the upper lid 3 and the cover 7 may be integrally formed.

Additionally, a light-transmitting plate which can transmit the light to be measured by the radiation thermometer 6, such as a quartz glass, may be disposed in the opening 5 so as to prevent a front surface of the radiation thermometer 6 from being fogged with vapor or the like from the material 1.

The temperature measurement can always be performed under suitable condition, if only the inner lid 4 is periodically detached and cleaned. The plurality of inner lids 4 may be prepared in order to avoid reduction in the device availability due to the cleaning.

The above light-transmitting plate disposed in the opening 5 of the inner lid 4 can be a filter that transmits light of particular wavelengths (e.g. infrared light) only. Then, the radiation thermometer 6 suitable to detect the light of the particular wavelengths is used, and it can enhance measurement accuracy in temperature. When the filter that selectively transmits the light with high emissivity of the material 1 is adopted, the measurement accuracy in temperature of the material 1 can be improved effectively.

The radiation thermometer 6 typically used is configured to take in the thermal radiation light from the material to be measured through a light incident opening 39, to condense the light with its lens, to introduce (condense) the light to its detector, and to measure the temperature of the material 1. The radiation thermometer 6 has its own optical axis and incident angle range (view angle) θ, which determines its measurable field. The desirable θ value can be selected from a variety of specifications of radiation thermometers 6.

The distance between the material 1 and the radiation thermometer 6, and the view angle θ determine a surface dimension of the measuring field of the material 1. As described below, the value θ is selected so as to achieve the suitable measuring field according to the shape of the container 2 and the amount of the material 1.

As shown in FIG. 1, the diameter of the opening 5 in the inner lid 4 is configured so that only the light in the incident angle range θ can enter the radiation thermometer 6. Consequently, unnecessary radiation light from other than the measuring field is prevented from entering into the radiation thermometer 6, and a measurement error of the radiation thermometer 6 due to an area effect may be reduced. More preferably, a cross-section of the opening 5 may slant and may form tapered shape.

An inclination angle of the cross-section of the opening 5 is determined according to a light receiving surface of the radiation thermometer 6, an area of the opening 5, and a distance between the light receiving surface and the opening 5. This prevents an edge of the opening 5 from affecting the light-condensing property of the incident light due to a diffraction phenomenon. Accordingly, it can suppress a decrease, which is caused by the diffraction phenomenon, in light receiving intensity adjacent to the edge of the opening 5. Additionally, a further optical element, such as Fresnel lens, may be disposed in the opening 5 in the inner lid 4 to change the value θ.

When the optical element is disposed on an extension line of the optical axis of the radiation thermometer 6 on the side of the container 2 and at a position separated away from the light incident opening of the radiation thermometer 6, the light entering the radiation thermometer 6 through the opening 5 can be refracted by the optical element and the value θ can be altered. Consequently, the measuring field can be appropriately adjusted depending on the container 2 and the amount of the material 1 without replacing the radiation thermometer 6 with other one. Such an adjustment of the measuring field can enhance measurement accuracy of the temperature.

The use of the inner lid 4 having the opening 5 prevents an operation rate of the temperature-measuring device from being lowered, and a variety of supports, such as enhancing measurement accuracy in temperature, can be achieved.

A power source 8, such as a button battery, is disposed above the radiation thermometer 6. The detector of the radiation thermometer 6 is typically axisymmetrical (cylindrical), and thus, a rotational axis around which the container 2 rotates, a central axis (optical axis) of the radiation thermometer 6, and a central axis (or the center of gravity) of the power source 8 (battery) may be configured to be aligned on a line. Consequently, while the rotational motion of the container 2 makes the radiation thermometer 6 and the power source 8 rotate around each central axis, the above configuration can easily achieve the effect of reducing a shake caused by the fluctuation of the center of gravity of the upper lid 3. This arrangement of the power source 8 is not limited to the above embodiment.

The radiation thermometer 6 is secured to a plate 9a of the upper lid 3, and the power source 8 is secured to a plate 9b of the upper lid 3 using bolts or the like. The bolts are disposed symmetrically with respect to a rotational axis of the container 2, and the plates 9a and 9b are preferably designed to be symmetrical with respect to the rotational axis of the container 2.

The plates 9a and 9b are electrically coupled through conductive wirings or the like, and a power switch 10 is disposed in the plate 9b. Upon processing the material 1 in the container 2, supplying electricity can be supplied to the radiation thermometer 6 by turning a power switch on (ON). In non-use, the electrical power supply can be stopped by turning a power switch off (OFF).

An acceleration sensor 30 may be additionally mounted on the plate 9a or 9b. The acceleration sensor 30 can be driven by the power source 8. It may be configured to automatically start supplying electricity to the radiation thermometer 6 when the acceleration sensor 30 detects acceleration over a predetermined threshold. This configuration can save labor of manually operating the power switch 10 and can also prevent the power switch 10 from failing to be turned on. Furthermore, when a rotary process is stopped and the acceleration sensor 30 detects acceleration below the predetermined threshold, the power supply is automatically stopped, thereby promoting power saving. In the above configuration, an output from the acceleration sensor 30 may operate a relay circuit.

The acceleration sensor 30 may be mechanically driven other than electrically driven. For example, the acceleration sensor, which has a weight and an elastic body, capable of mechanically turning on and off the power switch may be used, thereby further promoting power saving. Alternatively, a tiltmeter may be used instead of the acceleration sensor 30. The power switch may be configured to be turned on or off when the tiltmeter detects that the container 2 is disposed in or removed from a tilted container holder of the agitation/defoaming device.

As described above, the acceleration sensor or the tiltmeter with low or non power consumption is used to automatically detect whether an agitation/defoaming process is being performed, and then, the electrical power supply to the radiation thermometer 6 is started or stopped. It can prevent the battery from being wastefully consumed and can reduce the frequency of changing the battery.

An output from the radiation thermometer 6, that is, a value of the measured temperature may be sent to the outside of the container 2 through a radio communication means. The temperature measurement value obtained using the radiation thermometer 6 disclosed herein is not limited to numerical values converted into the temperature but also may be values of measured voltage, current, or the like corresponding to the temperature (values used in an electronic circuit).

Figure 2:
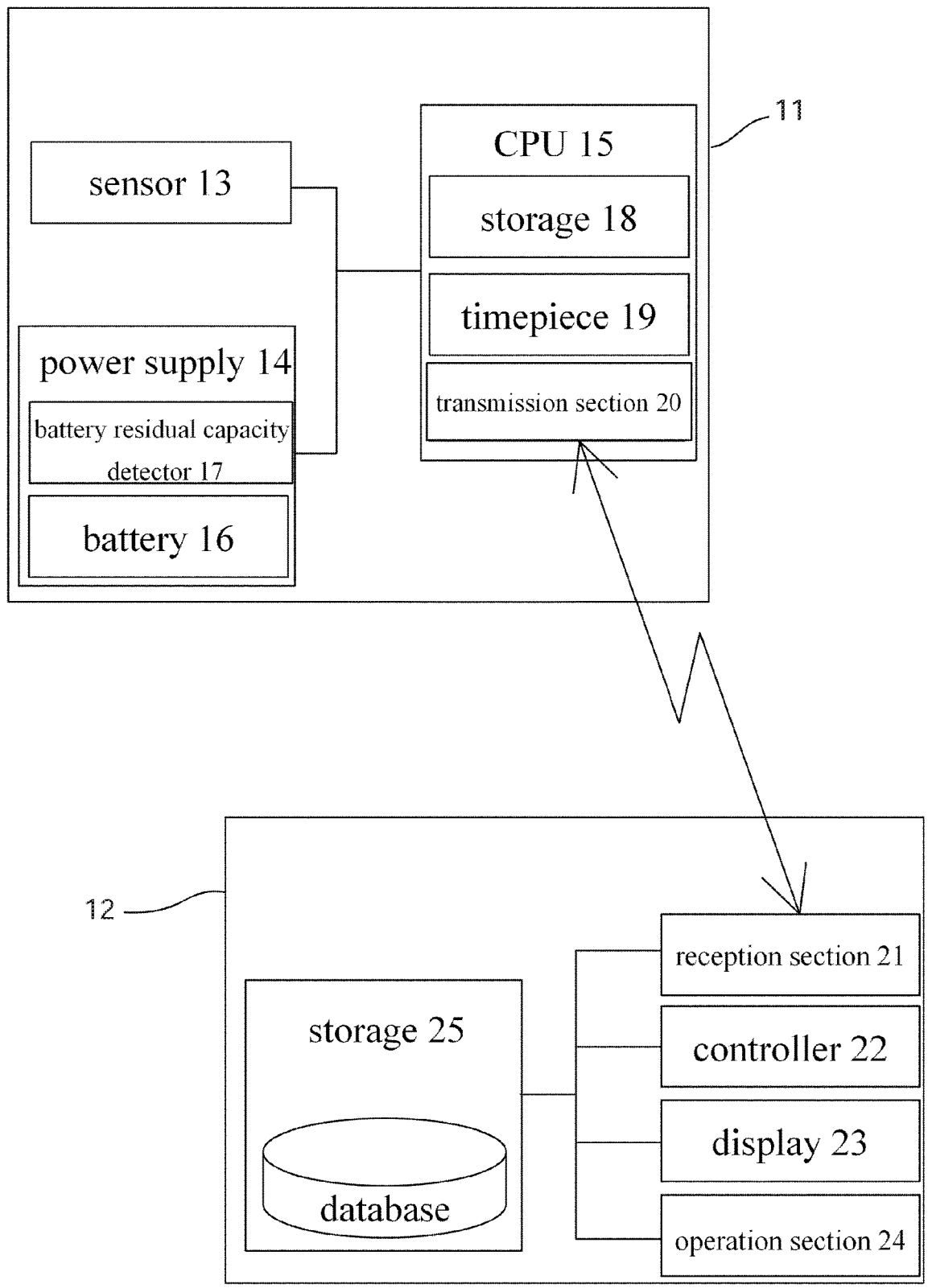
FIG. 2 is a block diagram of a temperature-measuring system according to the first embodiment of the present invention.

FIG. 2 illustrates a configuration example of a transmitter 11 configured to transmit data including the value of the measured temperature and a receiver 12 configured to receive the data.

As shown in FIG. 1, the transmitter 11 is mounted inside the cover 7 and comprises the radiation thermometer 6 and other elements, and each component of the transmitter 11 is secured to the plate 9a or 9b. The upper lid 3 and the cover 7 configure a housing to mount the transmitter 11. When the agitation/defoaming device revolves and rotates the container 2, the transmitter 11 is also revolved and rotated along with the container 2.

The transmitter 11 is secured to the upper lid 3 in an outside upper position of the container 2, and thus, the existing container can be used for the container 2. Another material 1 can be measured by only replacing the container 2 containing the material 1 with another container containing another material, and thus, this configuration is suitably used in a manufacturing plant for mass-producing products.

The receiver 12 is disposed separated from the container 2, is not revolved or rotated, and is built in a controlling part of the agitation/defoaming device. Alternatively, the receiver 12 is configured as a separate device different from the agitation/defoaming device, and for example, is configured using a PC (personal computer). The configuration that the separate device different from the agitation/defoaming device is used for the receiver can particularly add a temperature measuring function without remodeling the existing agitation/defoaming device.

Information may be electrically transmitted between the receiver 12 and the agitation/defoaming device. A known communication technology may be used for transmitting information. The transmitter 11 and the receiver 12 may be constructed using build-up (multilayered) substrates so as to miniaturize each unit. The configuration and function of the transmitter 11 and the receiver 12 will be described in detail below.

The transmitter 11 includes a sensor 13, a power supply 14, and a CPU (processor) 15. The power supply 14 includes one or more batteries 16 and a battery residual capacity detector 17. The CPU 15 includes storage 18, a timepiece 19, and a transmission section 20. The sensor 13 corresponds to the above radiation thermometer 6, and the batteries 16 correspond to the above power source 8.

The power supply 14, while supplying electricity to the sensor 13 and the CPU 15, detects a residual capacity of the batteries 16 using the battery residual capacity detector 17 and outputs the residual capacity to the CPU 15. The CPU 15 can transmit to the receiver 12 a request to exchange the batteries 16. Alternatively, the CPU may transmit the residual capacity of the batteries 16 to the receiver 12, and the receiver 12 may determine whether the batteries 16 require to be exchanged based on the received residual capacity.

The sensor 13 measures the temperature of the material 1 and outputs it to the CPU 15 as an electrical signal corresponding to the value of the measured temperature. Hereinafter for simplicity, "electrical signal corresponding to the value of the measured temperature" may be referred as to just "value of the measured temperature".

The CPU 15 requests the sensor 13 to output the value of the measured temperature at a predetermined time interval (cycle) measured by timepiece 19. The CPU 15 stores the value of the measured temperature from the sensor 13 into the storage 18 as data, converts the stored data and the measured time into a digital format by an arithmetic processing, and transmits the digitalized data to the outside of the transmitter 11 as an output signal using the transmission section 20. The data can be transmitted according to, in one example, a short-distance radio communication standard or an infrared communication standard.

The transmitter 11 may transmit as an output signal not only the value of the measured temperature but also the data including the residual capacity of the batteries, the measured time, other information to the receiver 12.

When electricity is supplied to the radiation thermometer 6 and the temperature measurement is started, the transmitter 11 starts measuring the temperature of the material 1 periodically at a predetermined cycle while the rotary process, such as an agitation/defoaming process, is being performed.

In the other words, during the agitation/defoaming process, the transmitter 11 repeats the following three steps as one transmission cycle:
a. a measurement step for measuring the temperature of the material 1 using the sensor 13 without contact;
b. a transmission step for transmitting data including a value of the measured temperature to the receiver 12; and
c. a standby step for waiting for a predetermined time (the measurement of the temperature is not performed).

In the above standby step, by changing the time for waiting (standby time), a cycle of measuring the temperature can be changed. The standby time, that is, the period of the cycle of measuring the temperature may be determined by, in one example, a predetermined value pre-stored in the storage 18 of the transmitter 11. However, as described below, the receiver 12 can also specify and change the standby time. The standby time specified by the receiver 12 is sent from the receiver 12, is received on the transmission section 20 in the transmitter 11, and is stored in the storage 18 as timing information for operating the radiation thermometer 6 in the transmitter 11. The transmission section 20 can transmit/receive data to/from the receiver 12, and can also receive the signal sent from the receiver 12 as described above. The transmitter 11 should not to be identified as a unit to only perform a transmission according to its name "transmitter 11".

When the standby time is short, the temporal change of the measured temperature can be monitored in detail, but the battery consumption increases. In one example, according to physical and chemical properties of the material 1 or the agitation/defoaming processing condition, both the requirement of the time resolution and energy-saving effect are considered, and then, the standby time can be appropriately determined. Additionally, the temperature may be measured synchronously with the revolving frequency.

The receiver includes a reception section 21, a controller 22, a display 23, an operation section 24, and storage 25. The receiver 12 receives a signal transmitted from the transmitter 11 by the reception section 21, converts the received signal into data including a value of the measured temperature (e.g. data including only the value of the measured temperature, or data including the value of the measured temperature, the measured time, and other information), and stores the data into the storage 25 by the controller 22. The reception section 21 can transmit/receive data to/from the transmitter 11, and can also transmit the signal from the receiver 12 to the transmitter 11 as described below. In one example, when the receiver 12 receives a first signal from the transmitter 11, the receiver 12 transmits to the transmitter 11 a second signal so as to notify the transmitter 11 that the receiver 12 has received the first signal from the transmitter 11. Consequently, the transmitter 11 can detect the presence or absence of a reception error on the receiver 12. If the transmitter 11 detects the reception error on the receiver 12, the transmitter 11 transmits the first signal to the receiver 12 again and the lack of the value of the measured temperature can be prevented. The receiver 12 should not to be identified as a unit to only perform a reception according to its name "receiver 12".

When the temperature measurement of the material 1 is started, the receiver 12 repeats the following two steps as one reception cycle:
a. a reception step for receiving the transmitted data including the value of the measured temperature;
b. a storing step for storing the data.

The receiver 12 is constantly operating while the agitation/defoaming process is being performed, in order to receive the output signal transmitted from the transmitter 11. Alternatively, if the receiver 12 is not constantly operating, the reception cycle may be operated synchronously with the transmission cycle including the measurement step, the transmission step, and the standby step.

Additionally, for an agitation/defoaming device capable of processing a plurality of containers (e.g. see FIG. 3), a plurality of transmitters 11 are used at the same time, and the communication is performed between one receiver and the plurality of transmitters. In this case, a known radio standard enabling one-to-multiple communication can be adopted.

The receiver 12 may be built in the agitation/defoaming device, but the receiver 12 may be configured to be separated from the agitation/defoaming device so that a variety of known agitation/defoaming devices can be effectively utilized and thus the extendability can be enhanced. By adopting wireless communication for data transmission/reception between the transmitter 11 and the receiver 12, it is possible for the receiver 12 to communicate with the transmitter 11 during the rotary motion. Furthermore, the above configuration using wireless communication can also be applied to, for example, an agitation/defoaming device that performs the agitation/defoaming process under vacuum.

The values of the measured temperature are stored in the storage 25 as a database (as temperature data) associated with the material 1 and each measurement time. When the plurality of transmitters 11 are provided, the values of the measured temperature for each transmitter 11 are stored in the respective database for each transmitter 11.

The display 23 can show the measured temperature, and also can graphically display the temperature changing over time. As described below, the display 23 can also display an alarm when an abnormality is detected during the agitation/defoaming process. The operation section 24 enables operators to input data. The operator, for example, may change the specification of the graph displayed by the display 23. Additionally, the operator may input the type of the material 1 and pre-store a physical property value or the like of the material into the storage 25, and the measured data may be stored in association with them into the database. In one example, the operator can also retrieve the data stored in the storage 25 and can analyze the data.

The operator can also input a command to forcibly terminate the agitation/defoaming process from the operation section 24. The command input from the operation section 24 is set to rank as the highest priority, and it allows the operator to forcibly terminate the process.

An emissivity can be pre-stored in the storage 25 in the database as the physical property value of the material 1, the emissivity of the material 1 can be read from the database using the controller 22, and the value of the measured temperature that the radiation thermometer 6 outputs can be also automatically modified. Since the emissivity varies depending on each material 1 and the value of the measured temperature of the radiation thermometer 6 depends on the emissivity, the modification of the value of the measured temperature by the controller 22 enables a more accurate value of the measured temperature to be easily obtained. Additionally, the receiver 12 can also transmit a command to measure the temperature to the transmitter 11, as described above.

According to the predicted change of the temperature of the material 1, the frequency of the temperature measurement is changed, thereby enhancing energy-saving effect in the transmitter 11.

In one example, when the temperature of the material 1 is predicted to change suddenly, the receiver 12 may transmit to the transmitter 11 a command to increase the frequency of the temperature measurement (shorten the temperature measurement cycle). Alternatively, when the temperature of the material 1 is predicted to change slowly, the receiver 12 transmits the other command to lower the frequency of the temperature measurement (lengthen the temperature measurement cycle). The receiver 12 may transmit the command of measuring the temperature to the transmitter 11 each time when the temperature is to be measured, and the transmitter 11 can start measuring the temperature every time it receives the command. Alternatively, the receiver 12 may pre-transmit to the transmitter 11 timing for measuring the temperature (time or cycle for measuring the temperature), and the transmitter 11 may start measuring the temperature according to the timing. In this case, the CPU 15 in the transmitter 11 may pre-store into the storage 18 the information of the timing for measuring the temperature, and the CPU 15 may control the sensor 13 to start measuring the temperature according the timing for measuring the temperature. When the transmitter 11 is driven by batteries, the above configuration can eliminate unnecessarily measuring the temperature and can extend the battery life.

Alternatively, timing for measuring the temperature corresponding to the material 1 and its processing condition may be pre-stored in the storage 25 in the receiver 12. The receiver 12 may read the timing for measuring the temperature using the controller 22, and then, may send the timing from the reception section 21 to the transmitter 11.

Figure 3:
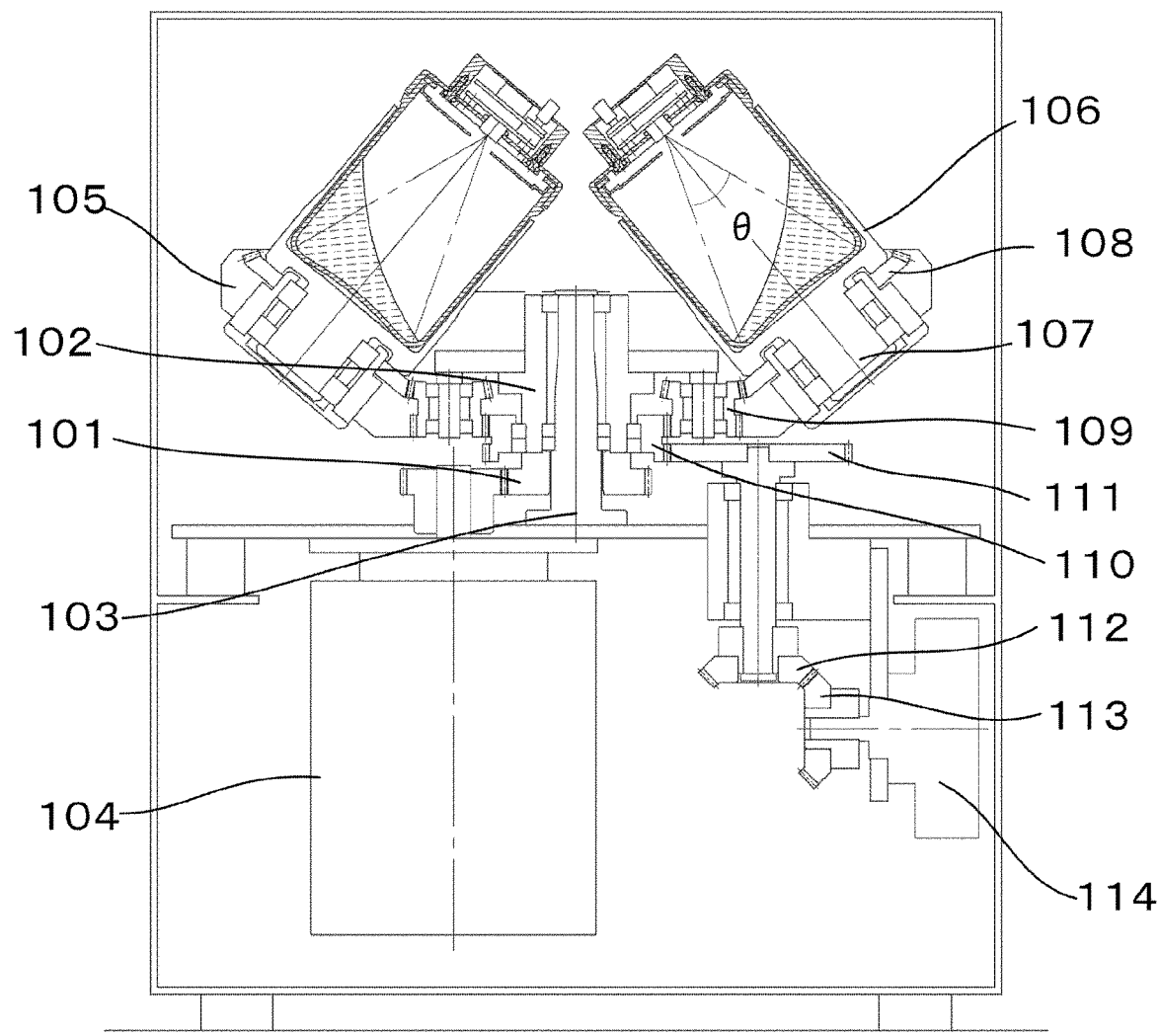
FIG. 3 is a cross-sectional view of an agitation/defoaming device with the temperature-measuring device according to the first embodiment of the present invention.

FIG. 3 illustrates one example of an agitation/defoaming device 100 where the containers 2 shown in FIG. 1 are placed. A revolving drum 102 having a revolving gear 101 is rotatably supported to a revolving shaft 103 (fixed shaft) via a bearing. A rotary motion produced by a motor 104 is conveyed to the revolving drum 102 via the revolving gear 101, and the revolving drum 102 is revolved around the revolving shaft 103. The revolving table 105 is coupled (secured) to the revolving drum 102 and is revolved together with the revolving drum 102. The container holder 106 has a rotary (rotational) shaft 107, and the rotary (rotational) shaft 107 is rotatably supported to the revolving table 105 via a bearing. In this way, the revolution of the revolving table 105 makes the container holder 106 be revolved around the revolving shaft 103.

The container holder 106 has a rotational gear 108. The rotational gear 108 is engaged with an intermediate gear 109 that is rotatably supported by the revolving table 105 via the bearing. Additionally, the intermediate gear 109 is engaged with a sun gear 110. The sun gear 110 is disposed outside the revolving drum 102 and is rotatably supported by a revolving drum 102 via a bearing. Additionally, the sun gear 110 is engaged with a gear 111. A braking force produced by a braking device 114, such as a powder brake, is conveyed to the gear 111 via gears 112 and 113 engaged each other. With no braking force produced by the braking device 114 (braking force is zero), the sun gear 110 is revolved following the revolving drum 102.

When the braking force of the braking device 114 is conveyed to the sun gear 110 via the gear 111, a rotary speed of the sun gear 110 is reduced compared with a rotary speed of revolving drum 102. The rotary speed of the sun gear 110 comes to be different from the rotary speed of the revolving table 105 coupled to the revolving drum 102. Consequently, the intermediate gear 109 is relatively rotated with respect to the sun gear 110. The intermediate gear 109 is engaged with the rotational gear 108, and thus, the rotational gear 108 is rotated and the container holder 106 is rotated (spun) around the rotational shaft 107. The above is a configuration example that the agitation/defoaming device 100 revolves and rotates the container holder 106 using one drive motor 104, but the configuration is not limited to the configuration example shown in FIG. 3. For example, the agitation/defoaming device 100 may include one drive motor for the revolving motion and the other drive motor for the rotational motion individually, and then, may revolve and rotate the container holder 106 using both. Alternatively, other configurations may also be adopted. The transmitter 12 can be disposed in the container 2 as described above, and thus, the configuration of the present invention is applicable to a variety of agitation/defoaming devices.

In FIG. 3, two containers 2 are provided. As seen in FIG. 3, the temperatures of the materials-contained in two or more containers 2 can be measured while the materials contained in two or more containers 2 are simultaneously agitated/defoamed.

As described above, the plurality of containers 2, that is, the plurality of transmitters 11 and one receiver 12 can be connected with each other by radio communication (radio waves, infrared, or the like). A variety of communication standards are available for the transmitters 11 and the receiver 12, because the amount of the data to be transmitted in one communication is small.

The container 2 is secured inside the container holder 106 of the agitation/defoaming device 100, and thus, the container 2 can be rotated while being revolved. A centrifugal force produced by the revolving motion of the container 2 raise up the material 1 along the side wall inside the container 2. As seen in FIG. 3, the range of the measuring field defined by the value θ of the radiation thermometer 6 is determined by the area of the bottom of the container 2, and thus, the radiation thermometer 6 can measure the temperature of the material 1, even if-the material 1 is raised-up. The value θ of the radiation thermometer 6 needs to be selected according to the amount of the material 1 and the shape (diameter, height, or the like) of the container 2.

Figure 4C:
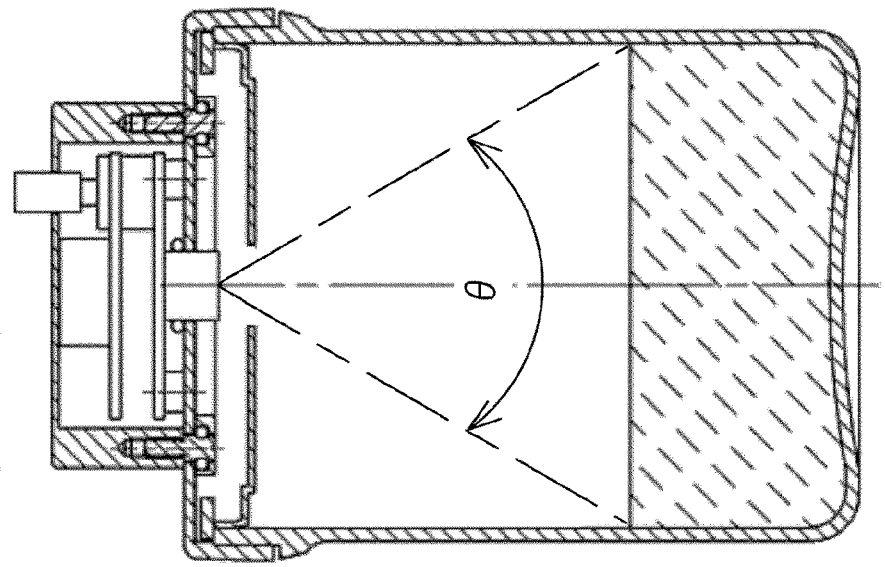
FIGS. 4A, 4B, and 4C are cross-sectional views of the containers schematically illustrating measuring fields of the temperature-measuring devices according to the first embodiment of the present invention.
Figure 4B:
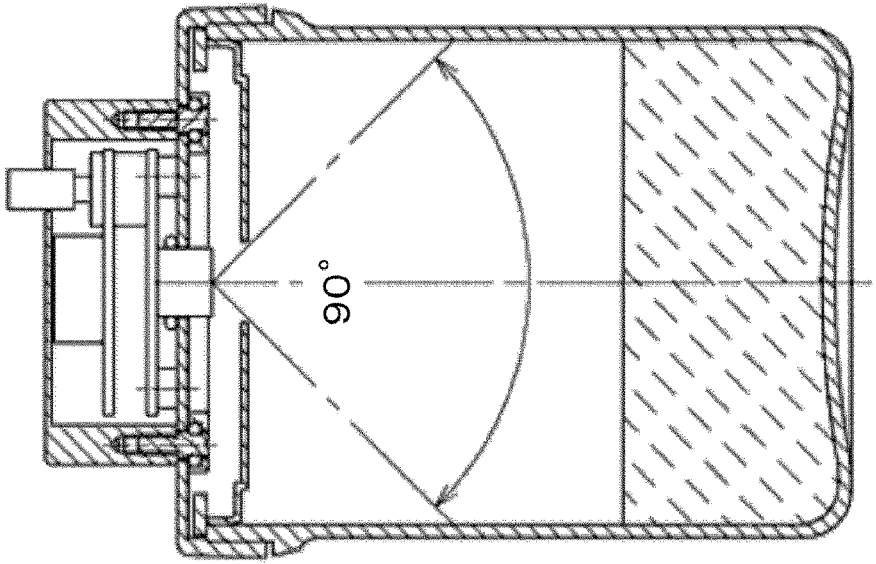
Figure 4A:
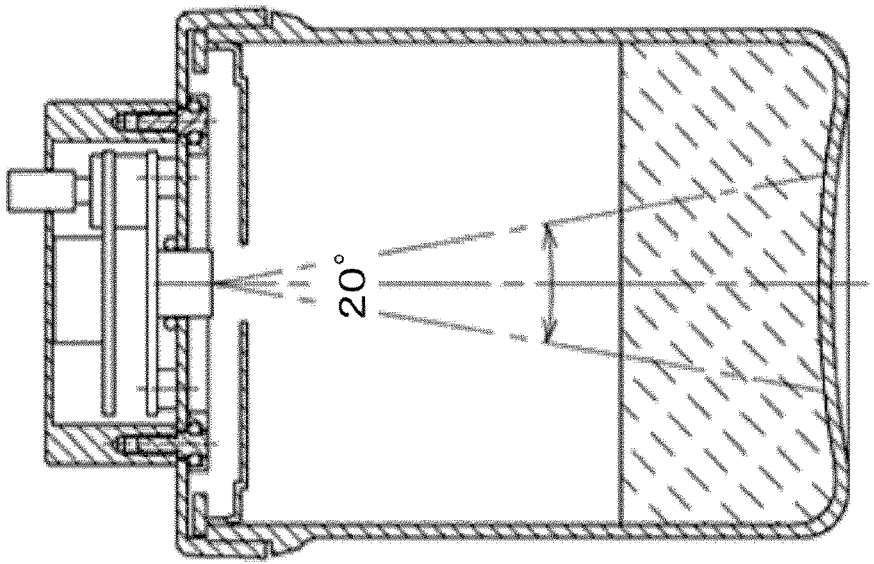

For example, the value θ of the radiation thermometer 6 may be determined to 20° as shown in FIG. 4A, and may also be determined to 90° as shown in FIG. 4B. In FIG. 4A, only the central portion of the surface of the material 1 can be measured. This configuration allows the temperature of only the limited area to be measured, that is, the mean temperature over the entire surface of the material 1 cannot be measured.

In FIG. 4B, the surface of the material 1 can be widely measured. With a small amount of the material 1, however, the radiation from the side wall of the container 2 may be added to the radiation from the material 1. Consequently, accurate measuring the temperature of the material 1 may fail.

In a preferable example of the value θ, as shown in FIG. 4C, while a motion of the container 2 is kept stationary and the material 1 is held in a horizontal state, the value θ is determined so that the measuring field of the radiation thermometer 6 covers the entire surface of the material 1 and substantively matches the surface area of the material 1. Additionally, depending on the state of the material 1 revolved and rotated as shown in FIG. 3, one example of the value θ shown in FIG. 4C can be further adjusted (e.g. to lower the value θ), and thus, the measuring field can be optimized.

The value θ can be appropriately selected in a range 20° to 90° according to the shape (diameter or height) of the container 2 or the amount of the material 1, that is, the temperature of the material 1 can be measured in a broad range of the conditions. The value θ is determined by the specification of the radiation thermometer 6, and thus, the radiation thermometer 6 with a desirable value θ can be selected from a variety of radiation thermometers 6 commercially available. Additionally, as described above, an additional optical element may be disposed in the opening 5 in the inner lid 4, and the use of the optical element can further adjust the value θ. Consequently, the value θ can be optimized for the container 2 and the material 1.

Consequently, the transmitter 11 and the receiver 12 can measure the temperature for an entire measuring field of the material 1 from the vicinity of the material 1 in the agitation/defoamation process. The transmitter 11 and the receiver 12 can accurately, reproducibly, and in real-time measure the temperature change over time without being affected by temporary and local temperature unevenness caused by a flow of the material 1 in the agitation/defoamation process. Additionally, the temperature of the material 1 can be measured without contact, and thus, the measurement does not affect (disturb) the agitation/defoaming process.

Application to Agitation/Defoaming Process

The receiver 12 includes the storage 25 and can record into the storage 25 the measured data in a database format. For the material 1, reference data (standard data to be a base) having the temperatures changing over time may be pre-stored in a database format, and a divergence value between the values of temperature that actually measured over time and the reference data may be calculated at any time by comparing them. It can be judged whether the agitation/defoaming process has been normally executed by the divergence value. Needless to say, the receiver 12 may include storage for pre-storing the reference data separately from the storage 25 (recordable area) for storing the values of the measured temperature.

With the embodiments of the present invention, for example, a mass-production plant where the same products are manufactured can store, manage, and utilize the measured temperature data for a quality control of the products.

In particular, when the materials 1 composed of the same material are processed in order to manufacture the same products, reference data having typical (or optimized agitation/defoaming condition) temperature changing over time is pre-measured and is pre-stored in the storage 25 in a database format in advance.

The divergence value between the temperature of the reference data and the measured temperature is calculated with the temperature difference at a predetermined time interval during the agitation/defoaming process. Then, the average value (or total value) of the temperature differences is calculated. When the absolute value exceeds the threshold, for example, the average value (or total value) deviates from a management criteria range, then, it is determined that an abnormality has occurred (the measured data has deviated from the reference data) and warning is given through a screen display, a lamp, or the like. Alternatively, when the abnormality has occurred, the warning content may be set to be stored in the database. When the divergence value of the temperatures is within the management criteria range, it is determined that no abnormality has occurred (the measured data is not deviated from the reference data).

Instead of the above temperature difference, the square of the temperature difference, or the average value (or total value) of the absolute value of the temperature difference may be used. When the above value exceeds the threshold, it is determined that an abnormality has occurred and the warning may be given. These values may also be used in combination, for example, both difference and its square are used, and then, it is determined whether an abnormality has occurred and the warning may be given in accordance with the result.

As described above, the divergence value is defined by using the difference, the square of the difference, or the average value (or total value) of the absolute value of the difference, and thus, the divergence value from the reference data can be quantitatively evaluated.

The threshold is set to correspond to the material 1 (or product specification), and, for example, the operator can input the threshold from the operation part 24 and can store it in the storage 25. The above divergence values are calculated continually as the measurement time passes, and it enables dynamically monitoring whether the measured value has deviated from the reference value and how far the measured value has deviated from the reference value. In other words, each divergence value is calculated with each measured data until the present time after the measurement of the temperature is started, and the agitation/defoaming process can be dynamically analyzed by updating the divergence value constantly as the measurement time passes. Consequently, it enables immediately determining whether the agitation/defoaming process is performed as scheduled and whether an abnormality has occurred and warning can be automatically given.

For example, when the average value of the square of the difference exceeds the threshold but the absolute value of the average value of the difference does not exceed the threshold, the warning is determined to be the warning level 1. When they both exceed the threshold, the warning is determined to be the warning level 2. The warning level may further be discriminated by discriminating whether the average value of the difference is minus or plus in one example, and the warning level can be determined corresponding to the physical property value of the material 1.

The controller 22 can perform these difference calculations or others, the display 23 can displays the warning level, and the information about the warning may be stored in the store 25 as the database. Furthermore, the data including the above divergence value may also be utilized to control the agitation/defoaming device.

Some materials 1 have upper-limit temperature value so as to prevent a chemical change of the materials 1 during the agitation/defoaming process. On the other hand, some other materials 1 also have lower-limit temperature value so as to enhance the agitation/defoaming effect.

Even in the above cases, the controller 22 in the receiver 12 transmits a command signal to a controller for controlling the rotary motion of the agitation/defoaming device 100 using the data including the above divergence value. It enables controlling of the processing condition of the agitation/defoaming device 100 and also maintaining the suitable processing condition controlled.

For example, when the divergence value between the reference data and the measured data falls below the lower limit value of the threshold, at least one of the revolving frequency and the rotational frequency can be controlled to be increased. When the divergence value exceeds the upper limit value of the threshold, at least one of the revolving frequency and the rotational frequency can be controlled to be decreased.

The radiation thermometer 6 has a high response speed, and thus, such a rotary frequency can be feedback-controlled.

Additionally, a radiant energy varies depending on the amount of the bubbles contained in the material 1, but the radiation thermometer 6 can also rapidly detect a difference and other conditions of the radiant energy. Not only the standard data, (data including temperature changing over time, which is obtained by measuring the temperature of the material 1 under an optimized condition for the agitation/defoaming process) but a variety of measured data of temperature changing over time for the materials 1 containing different amounts of the bubbles may be pre-stored in a database format in advance. By comparing the actually measured pattern (temperature change pattern over time) with the measured data of the temperature changing over time, the state of the material 1 in the process can be estimated from the most approximated temperature change pattern.

The comparison can be performed by the controller 22, and particularly, the divergence value between the measured data and the variety of temperature changing patterns over time are calculated as described above, and then, one pattern whose divergence value against the measured data is the smallest is selected.

Alternatively, the measured data is reproduced by linearly combining the temperature change pattern of the standard data and the other temperature change pattern of the material 1 in a specific state, for example, the material 1 having a large amount of bubbles. When the combining ratio for each temperature change pattern is studied, it can be estimated whether the state of the material 1 is close to either of the temperature change patterns. The combining ratio is used as a divergence value, and thus, the data can also be quantitatively analyzed. The combining ratio can be easily (algebraically) calculated with a least square approximation.

An identification of the temperature change patterns enables not only measuring the temperature but also estimating the state of the material 1. Consequently, it is available to detect the time to terminate the agitation/defoaming process.

Since the measured data is one variable of temperature, the temperature change patterns are easy to be identified and analyzed. Additionally, even without any advanced calculation technique, the analysis can be sufficiently and immediately made using normal personal computer and can also be made dynamically in real-time.

The most simplified model of the temperature change pattern may be assumed as below:

(1) the agitation/defoaming processing condition is unchanged, and the constant heat is generated by the friction between the material 1 and the container 2; and (2) the heat proportional to the temperature difference between the temperature (T(t)) of the material 1 and the ambient temperature (Ta) at the time t is transferred to the surroundings.

With a simple differential equation derived from these assumptions, the temperature of the material 1 (T(t)) can be expressed below.

$$T(t)=Ta+A(1-\exp(-\alpha t)) \qquad \text{(Equation 1)},$$

wherein $A$ and $\alpha$ are constants.

Although the above model is a simplified model, the equation 1 was confirmed to be consistent with the temperature change pattern that had been actually measured in the optimized agitation/defoaming condition. Validity of the value of the measured temperature was confirmed by the above.

On the other hand, in the temperature change pattern obtained by the measuring method at the bottom of the container 2, inflection points which cannot be predicted from the equation 1 were observed and it was confirmed that the accurate temperature cannot be consistently measured. Consequently, the advantages of measuring the temperature using the temperature-measuring device according the present invention were also confirmed. The controller 22 applies the actual measurement value to the above equation 1, obtains $A$ and $\alpha$ by a least squares method or the like, and predicts the temperature changes. When the temperature of the material 1 is predicted to exceed the upper limit allowed, the predicted result is transmitted to the agitation/defoaming device 100. Then, the controller of the agitation/defoaming device 100 may change (e.g. decrease) at least one of the revolving frequency and the rotational frequency, or may stop the agitation/defoaming process. On the other hand, when the temperature of the material 1 is predicted to fall below the lower limit, the controller of the agitation/defoaming device 100 may change (e.g. increase) at least one of the revolving frequency and the rotational frequency. Alternatively, the predicted upper limit and the predicted lower limit in the temperature change of the material 1 may be pre-stored in the storage 25, and the controller 25 may automatically perform the above processings upon the agitation/defoaming device 100.

The temperature change may be predicted by linear approximation based on a plurality of (e.g. three) most recent values of the measured temperature. Subsequently, with the prediction, whether the temperature of the material 1 exceeds the upper limit (lower limit) may be determined, and the controller 25 may perform the above processings upon the agitation/defoaming device 100.

Additionally, a revolving velocity, a rotational velocity, and each temporal change of torque of each drive system during the process can be stored in the storage 25 as device data, and correlation between the device data and the measured temperature data can also be analyzed. Consequently, the optimization of the agitation/defoaming condition can be easier.

In one example, for large torque of the drive system, high friction inside the material 1 or high friction between the material 1 and the container 2 can be predicted, that is, the correlation between the torque and the temperature can be monitored in real time.

Alternatively, the temperature of the container 2 may be monitored at the bottom of the container 2 using a thermocouple or the like. The difference between the temperatures change pattern of the container 2 measured by the thermocouple or the like and the temperature change pattern measured by the radiation thermometer 6 is pre-stored, and a comparison with the actual measured data may be performed in real time. Since the heat generation condition varies depending on the material property or the like of the material 1, a clear feature may appear with respect to time-dependency of the both patterns of the temperatures changing over time, and thus, the status of the material 1 can be indirectly monitored.

Second Embodiment

Typically, a radiation thermometer 6 condenses a light radiated from the material 1, introduces it to the detector, and measures the temperature of the material 1. The radiation thermometer 6 has an optical axis along which a light is condensed with its lens. In the first embodiment, the optical axis 31 of the radiation thermometer 6 and the rotational axis 32 of the container 2 are aligned on the same line.

Figure 5:
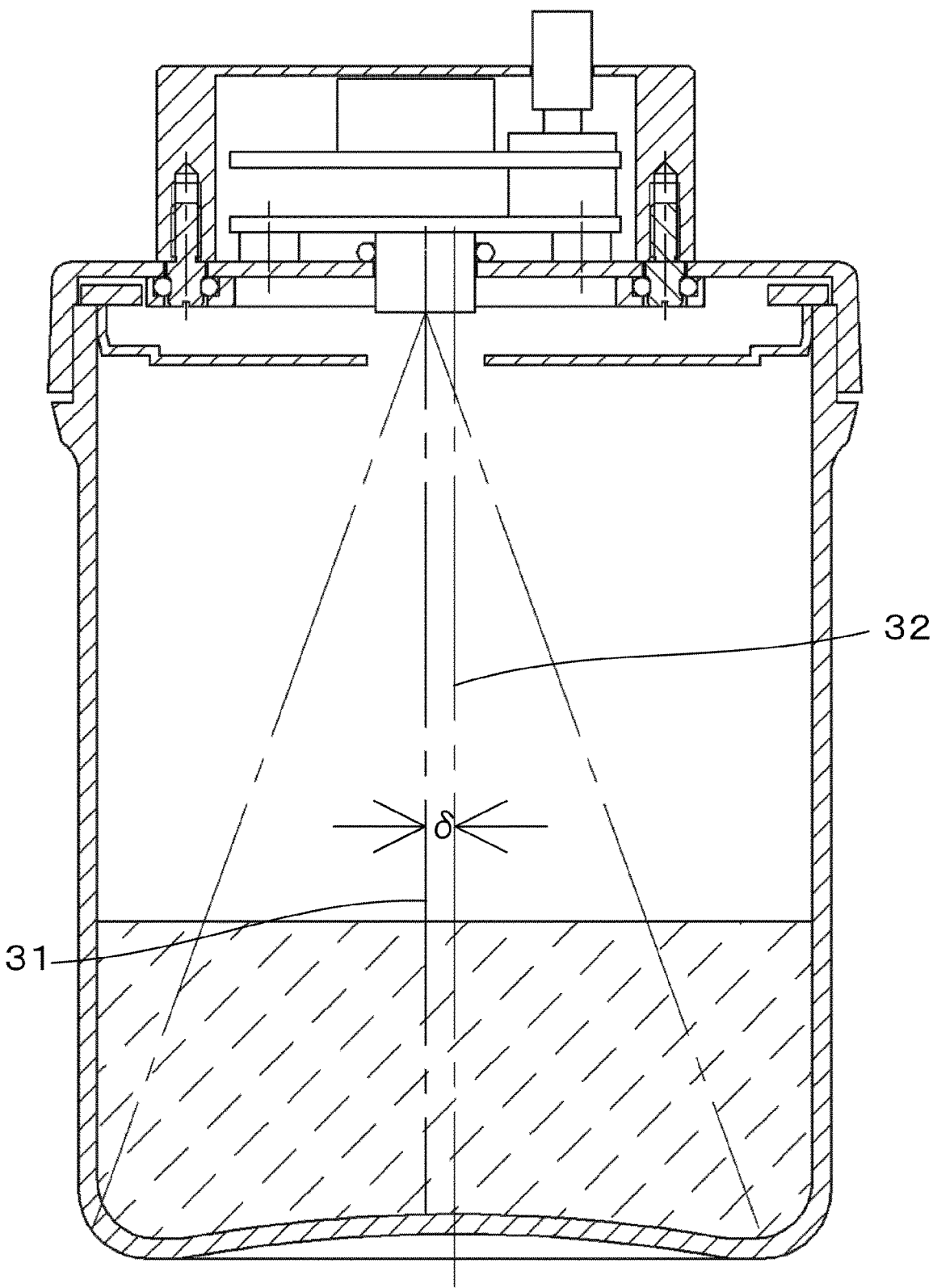
FIG. 5 is a cross-sectional view of the container with a temperature-measuring device according to a second embodiment of the present invention.

In the second embodiment, while the optical axis 31 of the radiation thermometer 6 keeps parallel to the rotational axis 32 of the container 2 as shown in FIG. 5, the optical axis 31 of the radiation thermometer 6 is shifted from the rotational axis 32 of the container 2 by a predetermined amount (distance) δ, for example about one tenth of the radius of the container 2.

The container 2 is rotated and revolved. When the container 2 is rotated at a high rotational frequency to enhance the agitation effect, the agitation effect is low in the vicinity of the rotational axis 32 and then, a centrifugal force of the rotation makes a depression in the material 1 at the central portion located on the rotational axis 32 of the container 2.

If the optical axis 31 of the radiation thermometer 6 is shifted from the rotational axis 32 of the container 2 by a predetermined distance δ, the influence of the depression in the material 1 can be reduced and the accuracy of the temperature measurement can be further improved.

Third Embodiment

The radiation thermometer 6 includes an optical system as described above and determines the measuring field. The measuring field is preferably optimized according to the amount of the material 1 in the container 2. For this purpose, a plurality of transmitters 11 which have radiation thermometers 6 with a variety of measuring field as their sensors 13 may be prepared, and then one transmitter 11 which has the most suitable measurement field may be selected. However, in this case, there is a problem that the cost increases.

Figure 6:
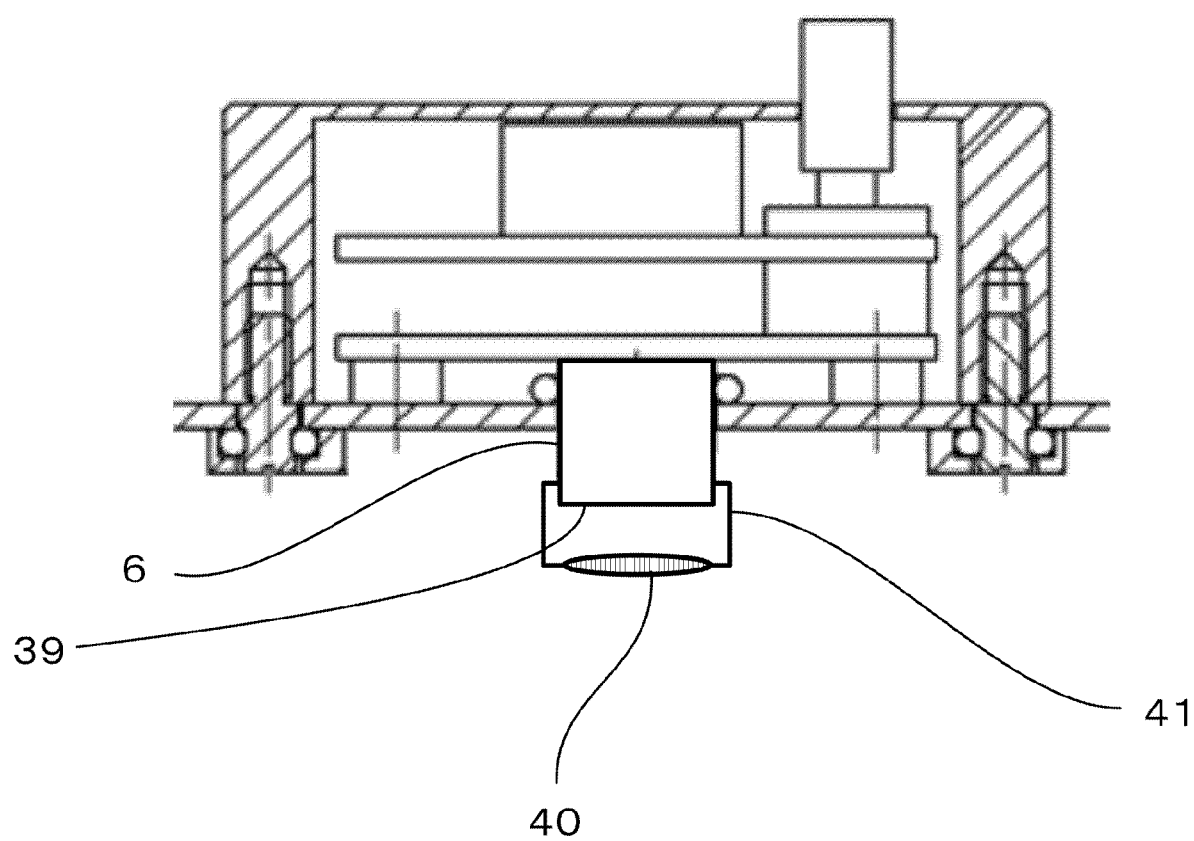
FIG. 6 is a partial cross-sectional view of the container with the temperature-measuring device according to a third embodiment of the present invention.

According to the embodiment of the present invention, one radiation thermometer 6 only needs to be prepared and it can optimize the measuring field. As shown in FIG. 6, the optical element 40, such as a convex lens, for refracting the incident light is secured to a movable support 41, and the movable support 41 is disposed in the light incident opening 39 of the radiation thermometer 6 (sensor 13). The movable support 41 can move in a parallel direction to the optical axis of the radiation thermometer 6 and can also be secured to the radiation thermometer 6 with screw or the like.

Moving the movable support 41 allows the optical element 40 to change a focal distance along the optical axis of the radiation thermometer 6 and the viewing angle of the light entering the radiation thermometer 6.

The radiation thermometer 6 is cylindrical and a screw thread is formed on its outer surface, and the movable support 41 is also cylindrical and a screw thread is formed on its inner surface. The pitch of the screw threads of the radiation thermometer 6 and the movable support 41 are configured to be matched. When the movable support 41 is rotated, the rotation can move the movable support 41 in an optical axis direction.

The movable support 41 additionally defines thread holes in the side wall and can be secured with bolts to the radiation thermometer 6 to be secured in the suitable position.

Additionally, the change of the position of the movable support 39 can continuously change the viewing angle. Consequently, unlike the case where the lens is used in the opening 5 of the inner lid 4, the viewing angle can be finely adjusted and further the measuring field can be optimized, thereby enhancing the measurement accuracy in temperature.

When the above configuration may be used in combination with the optical element (e.g. Fresnel lens) disposed in the opening 5 in the inner lid 4, the viewing angle can be changed in wide range.

Fourth Embodiment

Figure 7:
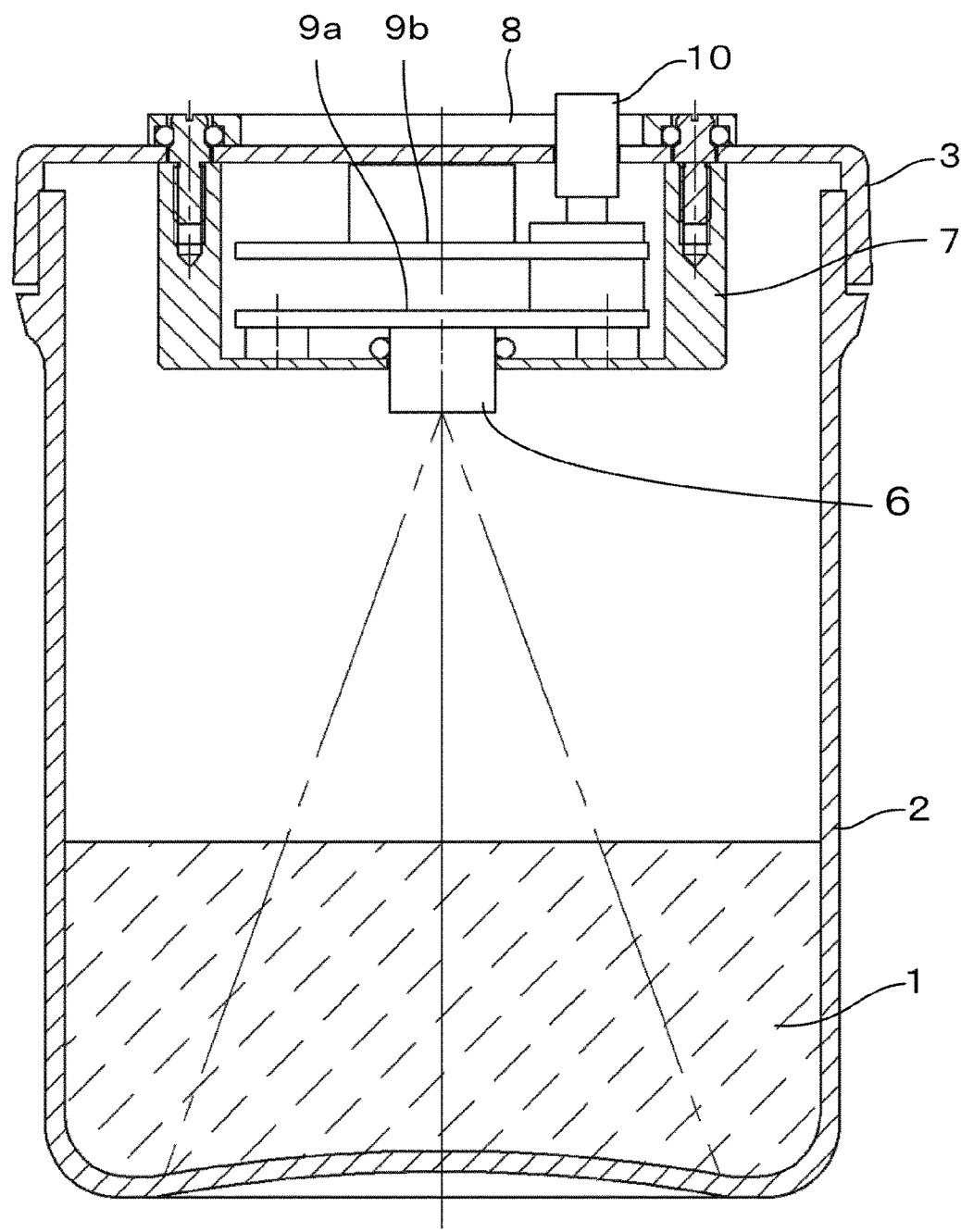
FIG. 7 is a cross-sectional view of the container with the temperature-measuring device according to a fourth embodiment of the present invention.

In the first embodiment, the cover 7 is secured to the upper lid 3 so as to protrude upward (outside of the container 1) and houses the transmitter 11. As shown FIG. 7, the cover 7 may be secured to the upper lid 3 so as to protrude downward, that is, so to face the container 2, and may house the transmitter 11. As shown in FIG. 7, the plates 9a and 9b are secured with bolts or the like to the cover 7, and the cover 7 is secured with bolts or the like from above to the upper lid 7. In such a configuration, the transmitter 11 can be mounted inside the upper lid 3, and the device can be downsized. Consequently, the device (temperature-measuring device) according to the present invention can be easily applied to the small agitation/defoaming devices.

In both of the first and fourth embodiments, the radiation thermometer 6 can directly and in real time measure the temperature of the material 1 from the above of the container 2, and thus, the description about the temperature measurement is omitted. In the above, "the above of the container 2" means the side opposing the bottom of the container 2 along the rotational shaft of the container 2.

Fifth Embodiment

The fifth embodiment takes countermeasures to the raise-up phenomenon due to the centrifugal force while the material 1 is agitated/defoamed. The optical axis of the radiation thermometer 6 is crossed (inclined) by a predetermined angle to the rotational axis of the container 2, and is directed to the portion where the material 1 is raised up. The temperature measurement can be made of the material 1 under optimized conditions according to the temporal status of the material 1 in the rotary process.

Figure 8:
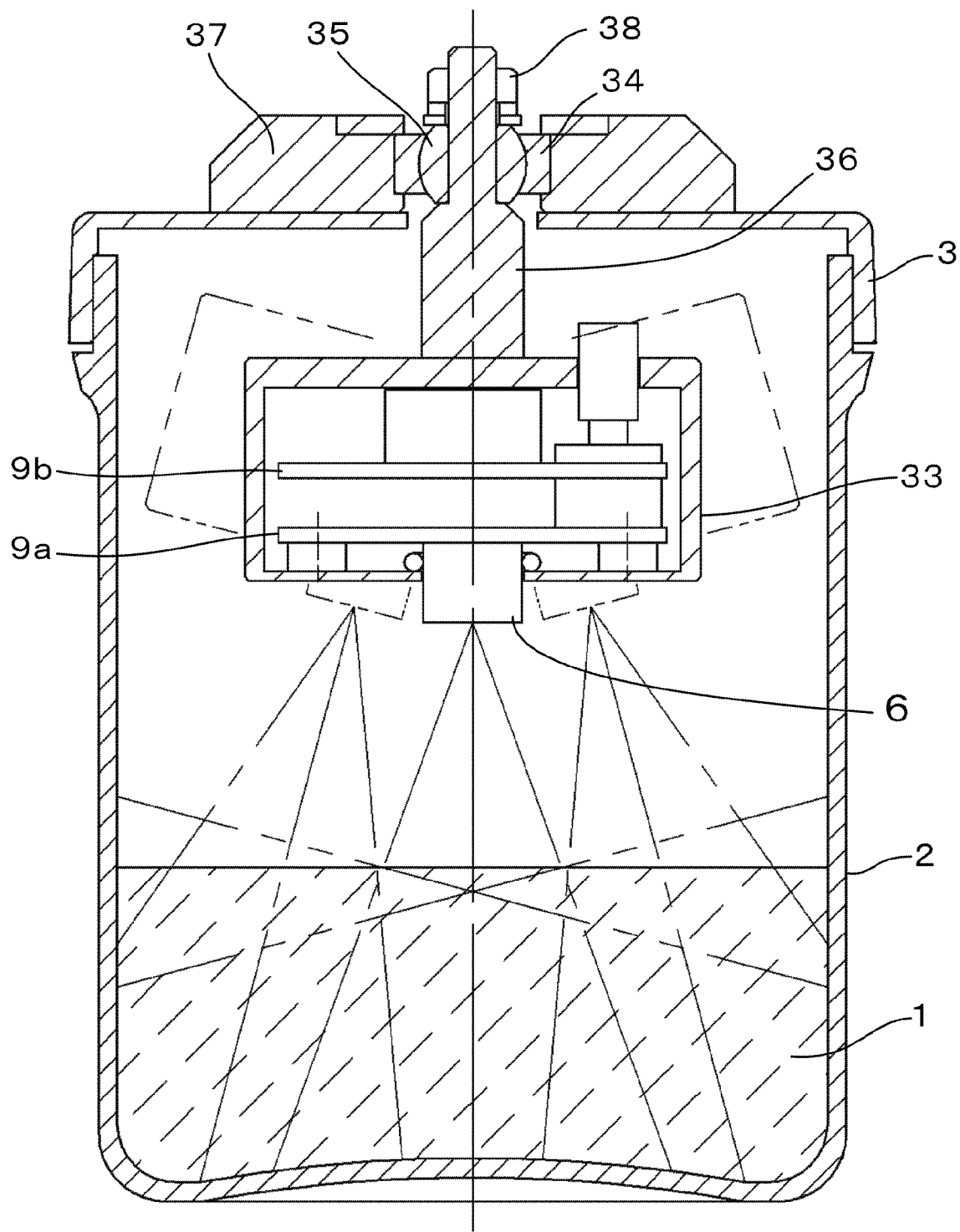
FIG. 8 is a cross-sectional view of the container with the temperature-measuring device according to a fifth embodiment of the present invention.

As shown in FIG. 8, the transmitter 11 includes the radiation thermometer 6 and other units, and is secured to the housing 33 via the plates 9a and 9b. The housing 33 corresponds to the cover 7 in FIG. 1 and houses the transmitter 11.

The housing 33 is secured to a shaft 36 coupled to a spherical body 35 of a spherical bearing 34, and is positioned to match the optical axis of the radiation thermometer 6 (sensor 13) of the transmitter 11 with the central axis of the shaft 36. The spherical bearing 34 is secured to a support 37, and the support 37 is secured to the upper lid 3.

At the timing that the upper lid 3 is disposed in the container 2, the support 37 is positioned so as to match the central axis of the shaft 36 with the rotational axis (rotation symmetry axis) of the container 2 in a stationary state. Consequently, the housing 33 is swingably supported by the spherical bearing 34 and can be inclined in all directions to the rotational axis of the container 2.

Additionally, a stopper 38 is secured to the shaft 36 and defines the maximum inclination angle of the shaft 36. In other words, when the shaft 36 is inclined, the stopper 38 interferes with the upper surface of the spherical bearing 34, controls the inclination angle, and prevents the shaft 36 from inclining beyond the maximum inclination angle (upper limit of the inclination angle). The maximum inclination angle is determined according to the extent of the raise-up level of the material 1. When the shape and the position disposed of the stopper 38 are changed, the maximum inclination angle can be changed.

As described above, the use of the spherical bearing 34 allows the housing 33 to be inclined (rotated) in all directions within the maximum inclination angle. The spherical bearing 34 allows the radiation thermometer 6 to be inclined freely, and the upper lid 3 including the radiation thermometer 6 is secured to the container 2. The container 2 is placed on the container holder 106 of the agitation/defoaming device 100, and then, the agitation/defoaming process is performed. The agitation/defoaming process generates a centrifugal force, and the centrifugal force inclines the optical axis of the radiation thermometer 6 in the direction away from the revolving axis. At this time, the material 1 is raised-up toward the direction away from the revolving axis.

The radiation thermometer 6 of the transmitter 11 secured to the housing 33, which is located above the container 2, can measure the temperature of the raised-up portion of the material 1. Consequently, the radiation thermometer 6 can measure the temperature of the raised-up portion of the material 1 in the container 2, without depending on the rotational motion of the container 2. The expression "above the container 2" means the side opposing the bottom of the container 2 along the rotational axis of the container 2.

Sixth Embodiment

The above embodiment is configured that the radiation thermometer 6 is secured to the container 2 via the upper lid 3. An agitation/defoaming device 200 in a sixth embodiment is configured that the radiation thermometer 6 does not secured to the container 202 but secured to the revolving body revolved along with the container 202. The temperature of the material 1 is measured with this configuration.

Figure 9:
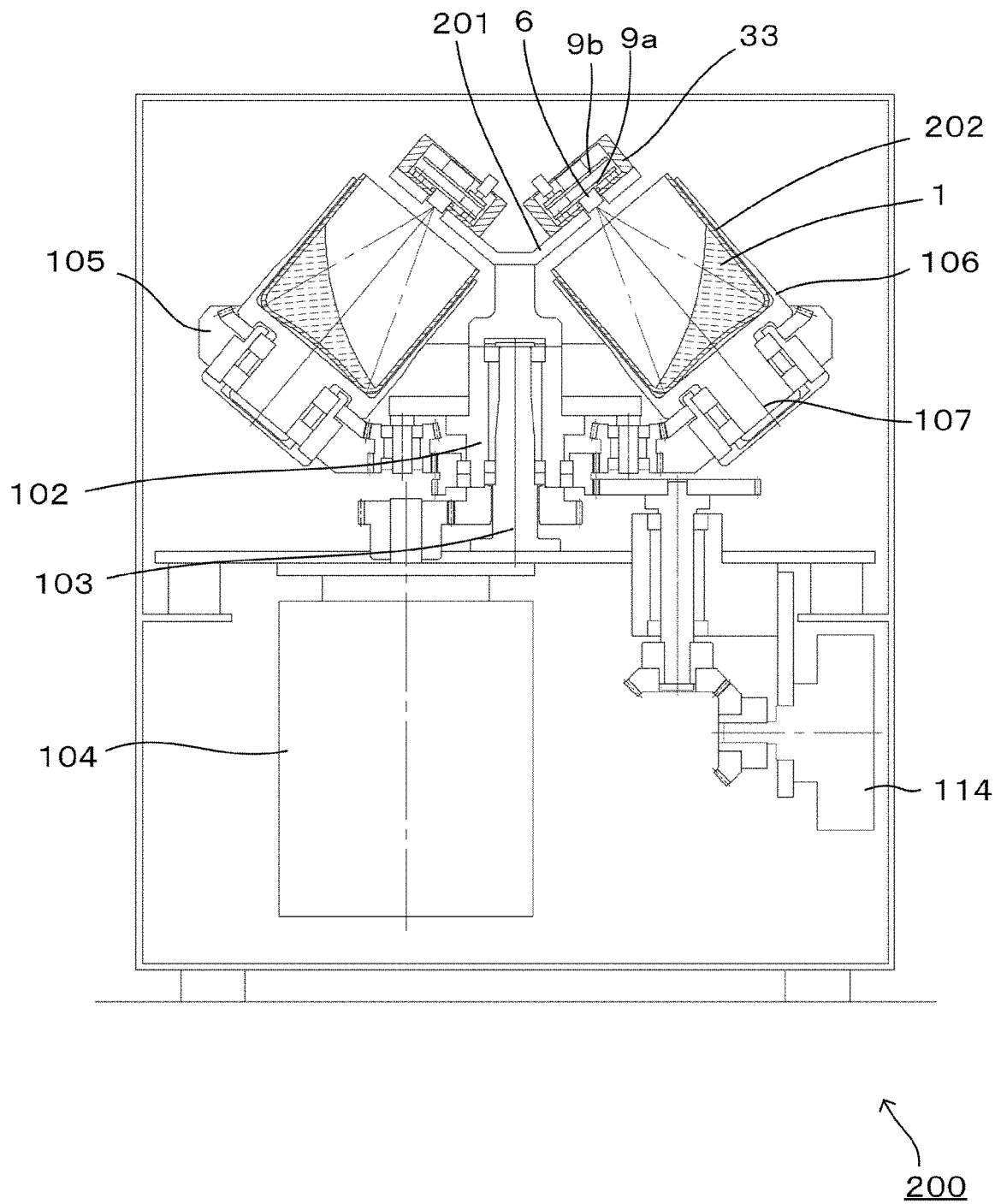
FIG. 9 is a cross-sectional view of an agitation/defoaming device with the temperature-measuring device according to the sixth embodiment of the present invention.

FIG. 9 shows one example of the configuration of the agitation/defoaming device 200. The agitation/defoaming device 200 is configured to be like the agitation/defoaming device 100. Such an agitation/defoaming device 200 includes the drive motor 104 and the drive motor 104 revolves the revolving drum 102 around the revolving shaft 103.

A revolving arm 201 is coupled (secured) to the revolving drum 102. The configuration enables the revolving arm 201 to be revolved along with the revolving table 105 supporting the container holder 106 via the revolving drum 102 and the revolving shaft 107. The revolving arm 201 extends above the container 202 disposed on the container holder 106. The expression "above the container 202" means the side opposing the bottom of the container 202 along the rotational axis of the container 202.

The housing 33 is secured to the revolving arm 201 above the container 202. The transmitter 11 including the radiation thermometer 6 and other units is secured to the housing 33.

The upper part of the container 202 is open. The optical axis of the radiation thermometer 6 is directed to the material 1 in the container, and thus the radiation thermometer 6 can measure the temperature of the material 1.

As shown in FIG. 6, an additional optical element may be disposed in the light incident opening of the radiation thermometer 6.

In the embodiment, only the container 202 can be replaced with another container 202 to measure the temperature of a new material 1. For example, this configuration, for mass production of the same products, facilitates exchange of the containers 202 and enhances productivity.

The transmitter 11 is not subject to the rotational motion, and thus, compared with the transmitter 11 to be rotated, durability of the transmitter 11 can be enhanced.

This configuration is not subject to the rotational motion different from the embodiment 5, and thus, the spherical bearing does not need to be used. The optical axis of the radiation thermometer 6 is inclined without using the spherical bearing, and the radiation thermometer 6 can be disposed at an angle allowing the radiation thermometer 6 to measure the temperature of the raised-up portion of the material 1.

Electricity can also be supplied to the transmitter 11 using a wire, instead of the power source 8, from outside via the revolving arm 201.

When button batteries are used for the power source 8, they must be periodically replaced. In this embodiment, however, electricity can be stably supplied without interruption of the power supply due to the battery exchange.

In one example, batteries are used to supply electricity as the power supply 8 in each above embodiment. However, a wireless power supply (using radio waves, light, or the like) may be used, the rotational or revolving motion may generate electricity, or solar batteries receiving the external light may be used for generating electricity.

When the rotational/revolving motion generates electricity, a regulator may be disposed in the power supply 14 of the transmitter 11 and it may configure to supply stable electricity to the radiation thermometer 6.

INDUSTRIAL APPLICABILITY

According to the present invention, the temperature of a material can be measured in real-time during rotation motioion, are performed. Temperature change of the material can be detected and the process altered to compensate.

Additionally, the measured temperature data of the material during the rotary process can be stored in a database format as a history and it also leads to a quality control of products.

Therefore, industrial applicability of the present invention is large.

REFERENCE SIGNS LIST 1. material
2. container
3. upper lid
4. inner lid
5. opening
6. radiation thermometer
7. cover
8. power source
9a and 9b. plate
10. power switch
11. transmitter
12. receiver
13. sensor
14. power supply
15. CPU (processor)
16. battery
17. battery residual capacity detector
18. storage
19. timepiece
20. transmission section
21. reception section
22. controller
23. display
24. operation section
25. storage
30. acceleration sensor
31. optical axis
32. rotational axis
33. housing
34. spherical bearing
35. spherical body
36. shaft
37. support
38. stopper
39. light incident opening
40. optical element
41. movable support
100. agitation/defoaming device
101. revolving gear
102. revolving drum
103. revolving shaft
104. motor
105. revolving table
106. container holder
107. rotational shaft
108. rotational gear
109. intermediate gear
110. sun gear
111. gear
112. gear
113. gear
114. braking device
200. agitation/defoaming device
201. revolving arm
202. container

The invention claimed is:

1. A temperature-measuring device comprising:
    a transmitter including a sensor configured to measure a temperature of a material without contact, the material being contained in a container being revolved and/or rotated, wherein the transmitter is configured to transmit data including a value of the measured temperature;
    a spherical bearing;
    a shaft coupled to the spherical bearing; and
    a receiver configured to receive the transmitted data,
    wherein the spherical bearing swingably supports the transmitter through the shaft relative to an upper lid detachably secured to the container so that the transmitter can be revolved along with the container;
    the sensor configured to detect an incident light emitted from the material, and
    wherein the optical axis of the sensor matches a central axis of the shaft.

2. The temperature-measuring device according to claim 1,
    wherein the central axis of the shaft matches a rotational axis of the container.

3. The temperature-measuring device according to claim 1,
    wherein the transmitter comprises:
        a power supply configured to supply electricity to the sensor; and
        a processor configured to transmit the data including the value of the measured temperature to the receiver, and
    wherein the receiver comprises:
        storage configured to store the transmitted data, wherein the transmitted data comprises the value of the measured temperature.

4. The temperature-measuring device according to claim 1,
    wherein the sensor has a view angle equal to or more than 20° and less than or equal to 90°.

5. The temperature-measuring device according to claim 1,
    wherein the sensor comprises an optical element that is movable in an optical axial direction of the sensor.

6. The temperature-measuring device according to claim 3,
    wherein the transmitter further comprises an acceleration sensor, and the sensor configured to measure the temperature is supplied with electricity when the acceleration sensor detects acceleration more than or equal to a predetermined threshold.

* * * * *